(12) United States Patent
Pietrowicz

(10) Patent No.: US 11,649,114 B2
(45) Date of Patent: May 16, 2023

(54) METHOD FOR PROCESSING A LIST OF CUSTOMER ORDERS IN A CUSTOMER-ORDER PREPARING SYSTEM AND CORRESPONDING CUSTOMER-ORDER PREPARING SYSTEM

(71) Applicant: Savoye, Dijon (FR)

(72) Inventor: Stephane Pietrowicz, Fixin (FR)

(73) Assignee: SAVOYE, Dijon (FR)

( * ) Notice: Subject to any disclaimer, the term of this patent is extended or adjusted under 35 U.S.C. 154(b) by 287 days.

(21) Appl. No.: 16/881,960

(22) Filed: May 22, 2020

(65) Prior Publication Data
US 2020/0369472 A1 Nov. 26, 2020

(30) Foreign Application Priority Data
May 23, 2019 (FR) ...................................... 1905411

(51) Int. Cl.
*G06F 7/00* (2006.01)
*B65G 1/137* (2006.01)
(Continued)

(52) U.S. Cl.
CPC ....... *B65G 1/1376* (2013.01); *B65G 47/8807* (2013.01); *G05B 19/042* (2013.01);
(Continued)

(58) Field of Classification Search
CPC .............. B65G 1/1376; B65G 47/8807; B65G 2201/025; B65G 2203/0233;
(Continued)

(56) References Cited

U.S. PATENT DOCUMENTS 6,186,724 B1   2/2001 Hollander
8,327,069 B2  12/2012 Krizmanic et al.
(Continued)

FOREIGN PATENT DOCUMENTS

DE   19823083 A1   5/1998
EP    1199667 A1   4/2002
(Continued)

OTHER PUBLICATIONS

French Search Report and Written Opinion dated Mar. 24, 2020 for corresponding French Application No. 1905411, filed May 23, 2019.
(Continued)

*Primary Examiner* — Yolanda R Cumbess
(74) *Attorney, Agent, or Firm* — David D. Brush; Westman, Champlin & Koehler, P.A.

(57) ABSTRACT

Processing a list of customer orders with a control system and a preparing station, which includes a picking position, an insertion position and local recirculation. The control system: selects a reference in the greatest number of order lines of the list; determines a set E of all the $N_E$ orders each containing an order line containing the selected reference; creates a group G of N orders that are the $N_E$ orders, if $N_E \leq N_{max}$ with $N_{max}$ being a predetermined threshold, or the $N_{max}$ first orders of the $N_E$ orders sorted according to decreasing order of priority, if $N_E > N_{max}$; builds a list LC of the K order lines in the N orders of the group G; and controls
(Continued)

the system to bring source loads to the picking position and ship loads to the insertion position and to make the shipping loads recirculate to the insertion position, according to the list LC.

11 Claims, 13 Drawing Sheets

(51) Int. Cl.
*B65G 47/88* (2006.01)
*G05B 19/042* (2006.01)
*G06Q 10/0631* (2023.01)
*G06Q 50/28* (2012.01)

(52) U.S. Cl.
CPC .  *G06Q 10/06312* (2013.01); *G06Q 10/06315* (2013.01); *G06Q 10/06316* (2013.01); *G06Q 50/28* (2013.01); *B65G 2201/025* (2013.01); *B65G 2203/0233* (2013.01); *G05B 2219/2621* (2013.01)

(58) Field of Classification Search
CPC .......... B65G 2201/0258; B65G 1/1378; B65G 37/02; G05B 19/042; G05B 2219/2621; G06Q 10/06312; G06Q 10/06315; G06Q 10/06316; G06Q 50/28; G06Q 10/0631; G06Q 10/0833; G06Q 10/087; G06Q 10/08
USPC .......................................... 700/213–216, 230
See application file for complete search history.

(56) References Cited

U.S. PATENT DOCUMENTS

| 2007/0219916 A1* | 9/2007 | Lucas .................... G06Q 10/08 705/58 |
| 2007/0239569 A1* | 10/2007 | Lucas .................. G06Q 10/087 705/28 |
| 2015/0114799 A1 | 4/2015 | Hansl et al. |
| 2015/0151913 A1* | 6/2015 | Wong .................. B65G 1/1373 700/214 |

FOREIGN PATENT DOCUMENTS

| FR | 2915979 A1 | 5/2007 |
| WO | 2017149695 A1 | 9/2017 |
| WO | 2018006112 A1 | 1/2018 |

OTHER PUBLICATIONS

English translation of the French Written Opinion dated Mar. 24, 2020 for corresponding French Application No. 1905411, filed May 23, 2019.

* cited by examiner

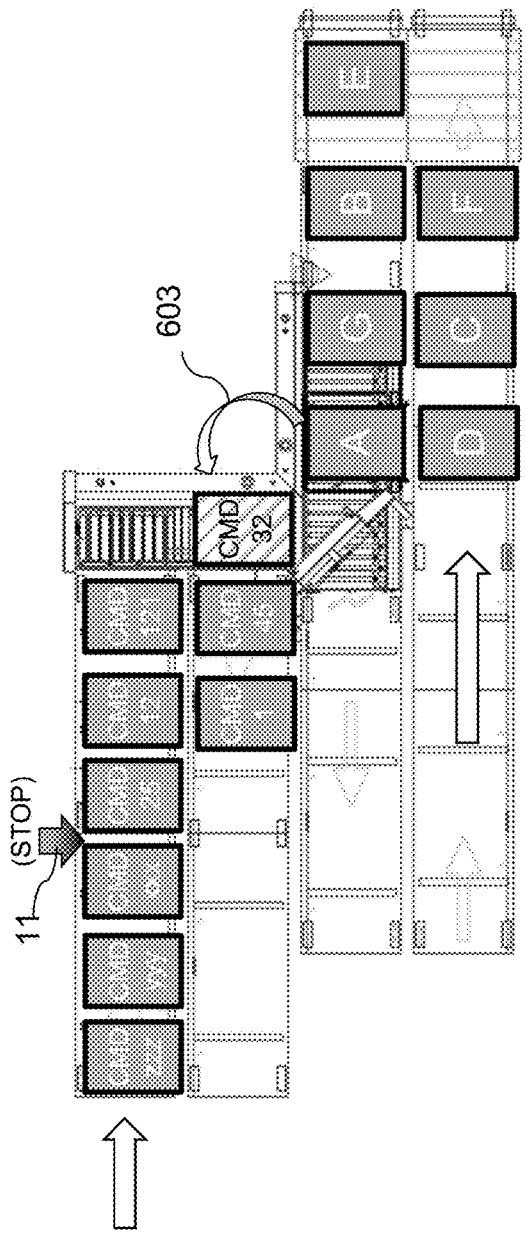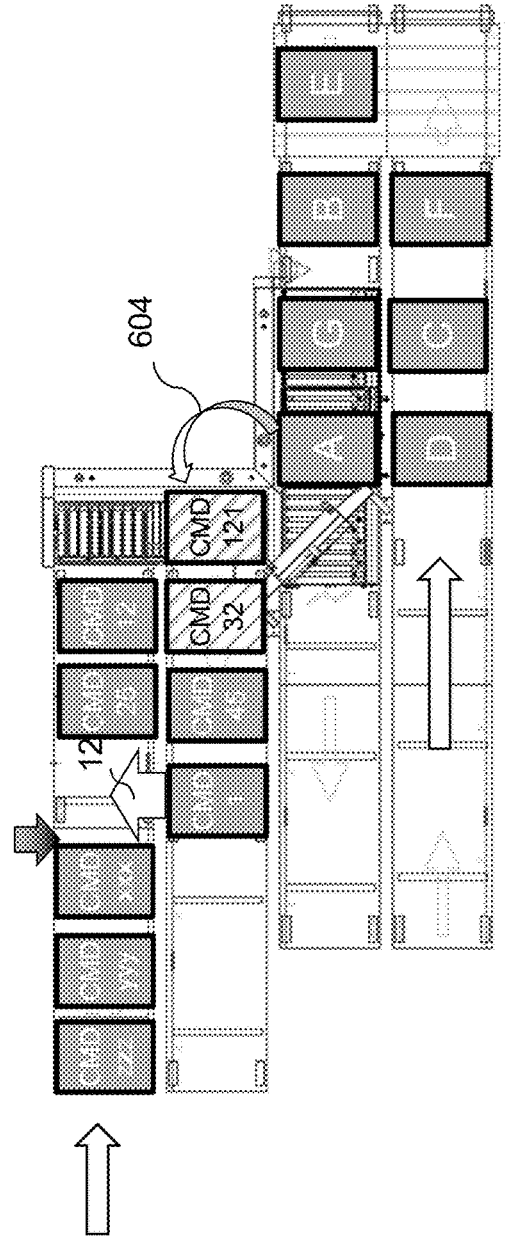

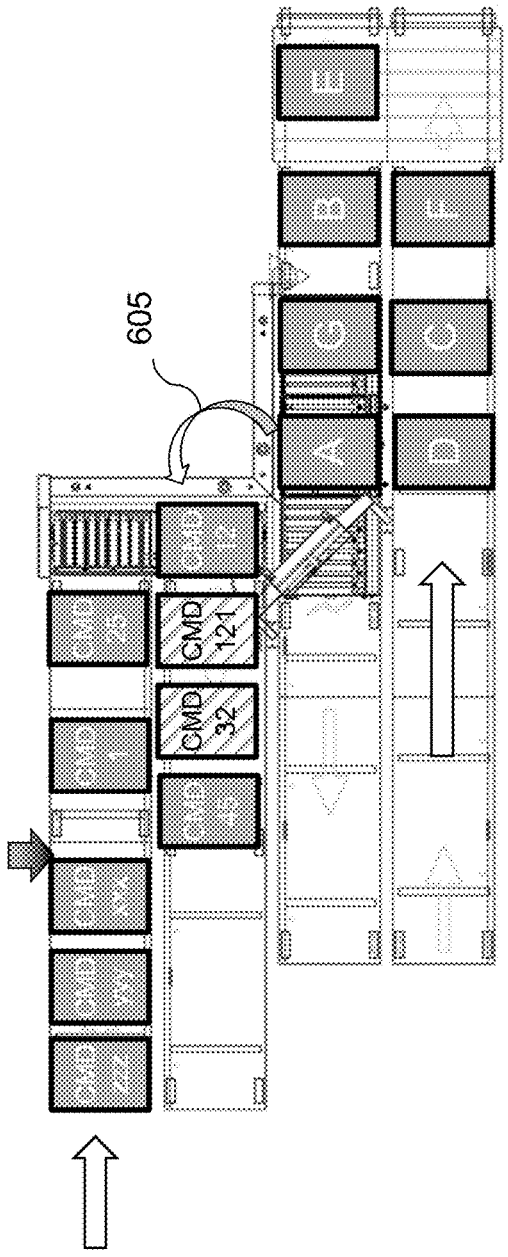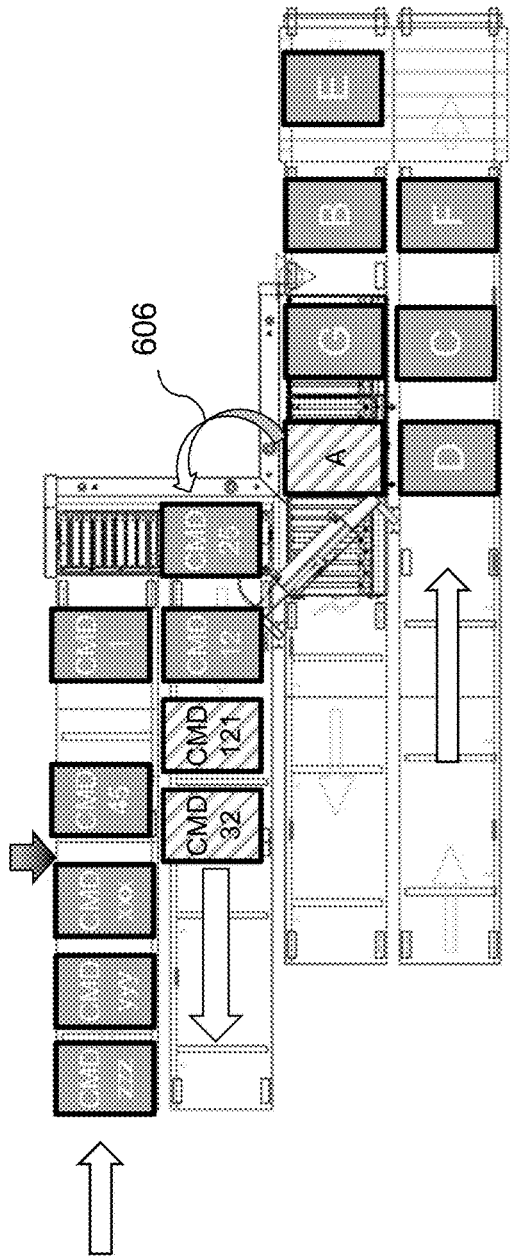

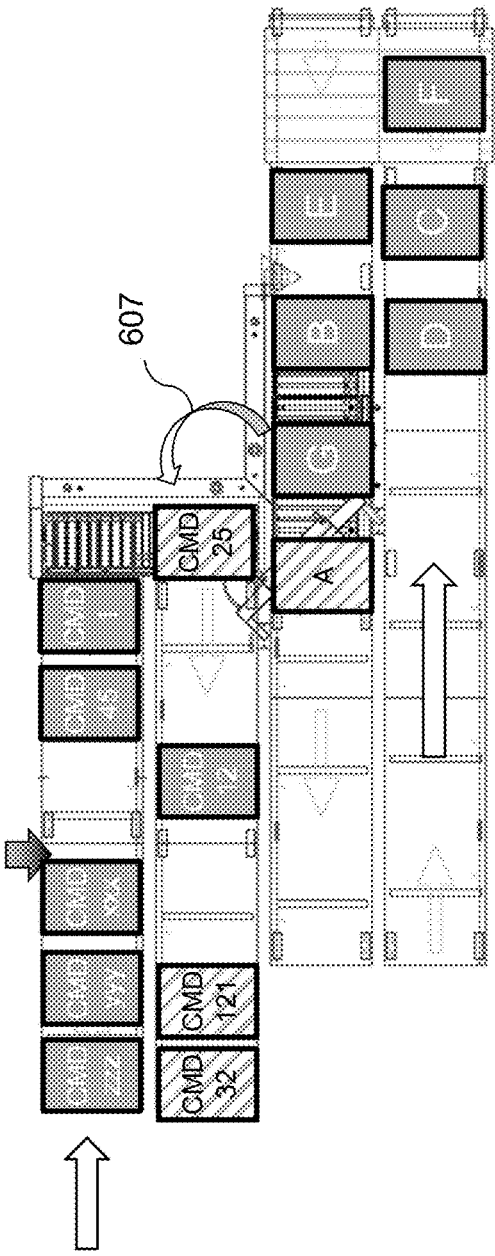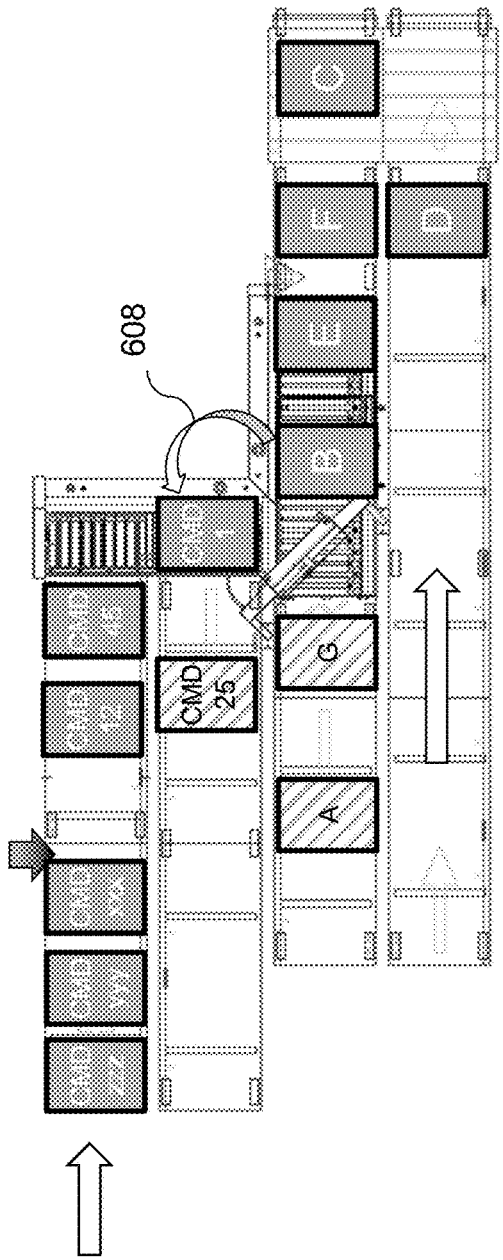

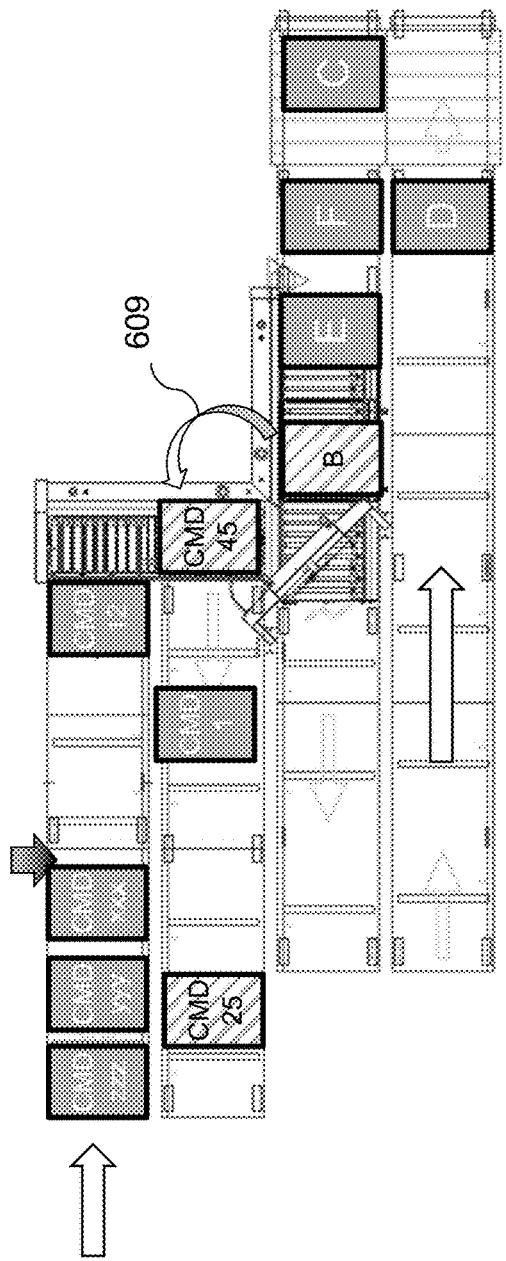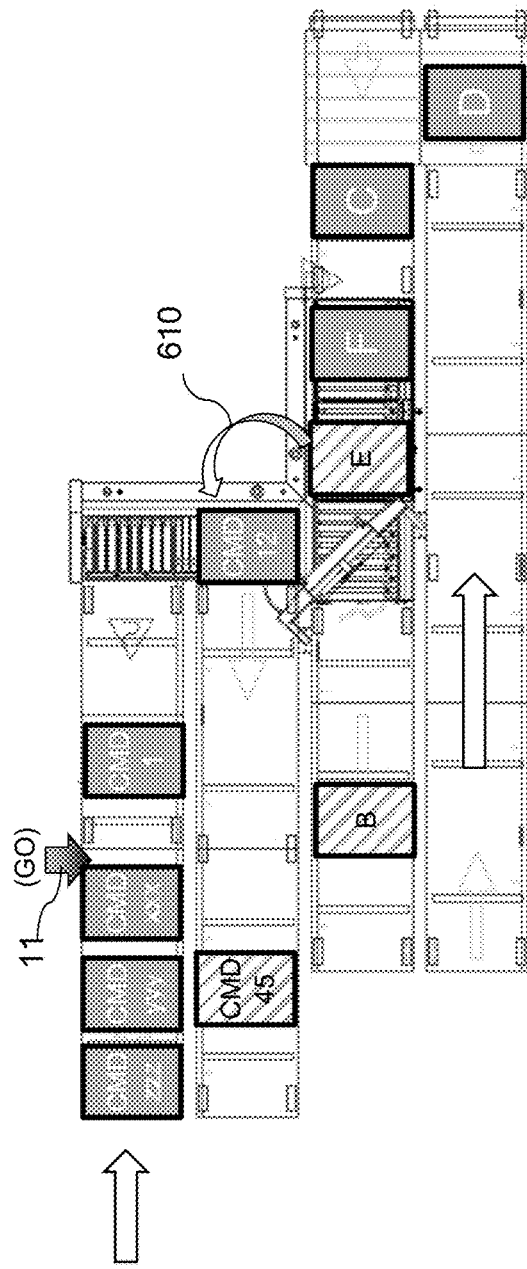

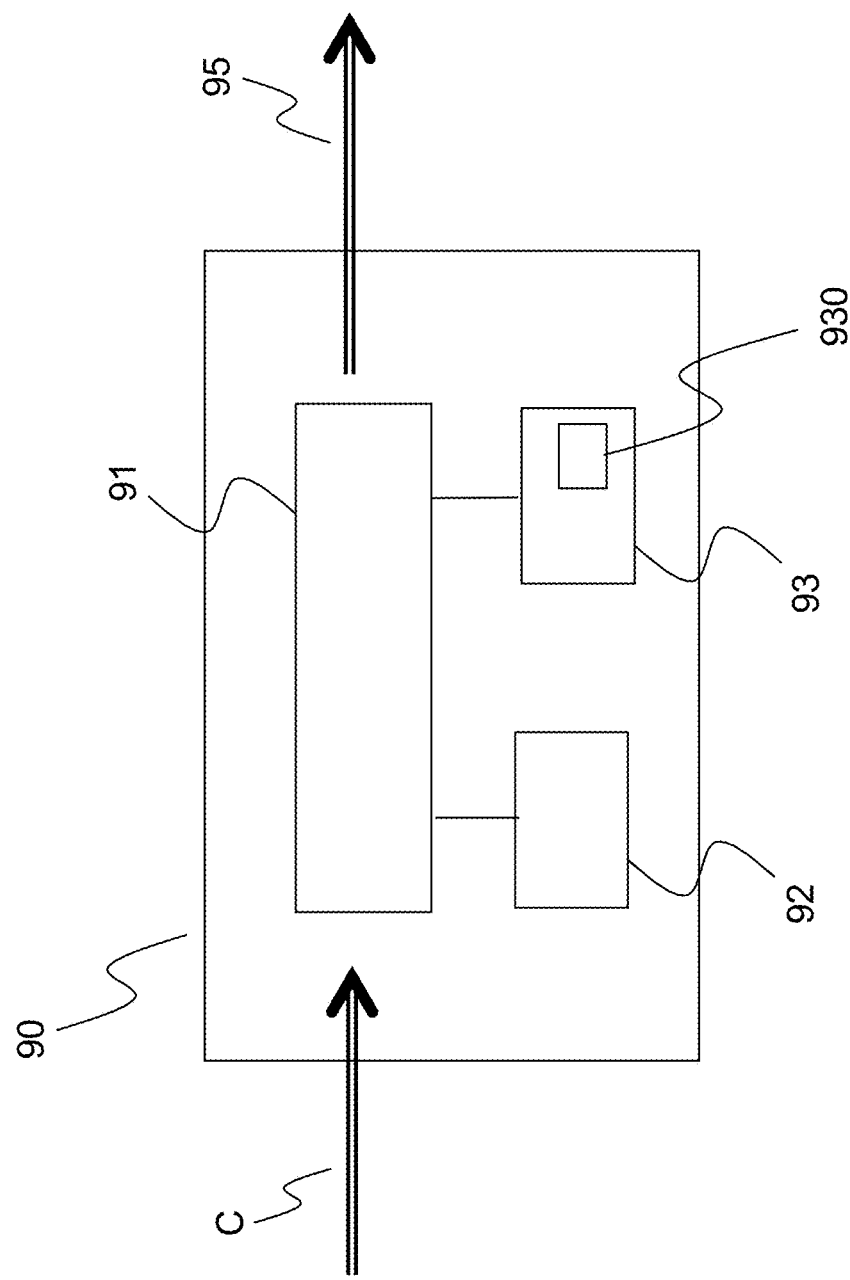

METHOD FOR PROCESSING A LIST OF CUSTOMER ORDERS IN A CUSTOMER-ORDER PREPARING SYSTEM AND CORRESPONDING CUSTOMER-ORDER PREPARING SYSTEM

1. TECHNICAL FIELD

The field of the invention is that of logistics and especially customer-order preparing systems (also called picking systems) of the "goods-to-person" (GTP) or "goods-to-robot" type wherein it is the different goods (also called products or unit loads) of a customer order that must come to the operator or to the robot and not the contrary.

More specifically, the invention relates to a method for processing a list of customer orders in such a customer-order preparing system as well as to a corresponding customer-order preparing system (i.e. a system configured to implement the method).

Customer-order preparing systems are especially used in companies for the distance selling and shipping of goods in small volumes. The main examples of users of such systems are suppliers of office equipment, clothing, cosmetic items, tools and spare parts in the mechanical industry. These systems enable the preparation, with minimum labor, within short deadlines and with precise tracking of stocks, of a shipping load (shipping package) corresponding to a precise order from a customer.

One example of an automated system for preparing customer orders is described especially in the patent application FR 2 915 979 filed by the present Applicant. It comprises for example:

- an automated storage depot (also called an automated storage and removal installation) containing products (articles) in storage containers (source loads), each storage container being associated with one or more product references or identifiers. Indeed, even if this is not the most frequent case, the storage container can, in certain cases, be associated with several product references (depending on the configurations, the products with different references are physically separated from one another, or partially separated from one another or, again, completely intermingled);
- (at least) one preparing station, where the products are picked and placed by an operator (or a robot) in a shipping parcel (shipping load);
- a set of conveyors (or moving robots) conveying the storage containers, in which the products are located, from the storage depot to the customer-order preparing station and vice versa; and
- a warehouse control system (WCS).

2. TECHNOLOGICAL BACKGROUND

In a customer-order preparing system, each customer order comprises one or more customer-order lines. Each customer-order line comprises a customer-order identifier, a product reference of a product and a unit load quantity (i.e. a unit load (or product) reference and a unit load quantity for this reference (or product)) and a priority level.

A customer-order preparing system comprises especially a control system (also called a management system, a control unit or a central management computer system) and at least one preparing station (also called a picking station).

Each preparing station receives, on the one hand, source loads (also called "source supports", "internal supports" or "storage containers") each containing unit loads of one (or more) products and on the other hand shipping loads (also called "destination supports", "external supports", "parcels" or "shipping containers") each intended to contain the unit loads required by one of the customer orders. More specifically, each preparing station comprises one or more picking positions at which the source loads are presented, and one or more insertion positions at which the shipping loads are presented. An operator (or a robot) is placed before the picking position or positions and the insertion position or positions and he or it carries out the following actions: for each customer-order line of a given customer order (and therefore of a given unit load reference), he or it picks the desired quantity of unit loads from one of the source loads and inserts these unit loads into one of the shipping loads.

If it is not possible to contain all the unit loads required by a customer order formulated by a customer in a single shipping load, then it is assumed that, in a step prior to the processing operation proposed and described in detail here below, the customer order formulated by the customer is divided into a plurality of customer orders as understood here above (i.e. customer orders for each of which the unit loads required can be contained in a single shipping load).

Since it frequently happens that several customer orders require the same type of product (a product common to several customer orders) and, at the same time, that one and the same customer order requires several types of products (a customer order with multiple product references), the current customer-order preparation stations are of the type with "n picking positions towards m insertion positions" with n≥2 and m≥2. In general n and m are comprised in the range [2 to 6]. In other words, the operator (or robot) is placed before n picking positions (that can contain n source loads) and m insertion positions (that can contain m shipping loads) and he or it must prepare several customer orders at a time in carrying out the following actions: for each customer-order line of a given customer order, he or it must first of all pick out the desired quantity of unit loads from one of the source loads present in the n picking positions and then he or it must insert these unit loads into one of the m shipping loads present in the m insertion positions.

One drawback of the current customer-order preparing stations (of the "n towards m" type) is that the operator must always take care to pick up a load from the right source load (among n) and deposit it in the right shipping load (among m). This constraint has an impact on the quality of the preparation (an increase in the risk of error in the preparation of customer orders) and the operator's performance (the mental stress on the operator is high because he must constantly verify his work and this leads to frequent changes of operators at the preparing station).

Another drawback of current customer-order preparing stations is that they do not enable the optimal management of the installation (whether automated or not) for the storage and removal of source loads, that gives the source loads to the preparing station and takes them up again after the unit load picking operation. Indeed, with present customer-order preparing stations, the reduction of the number of exit movements needed by the installation for the storage and removal of the source loads (internal supports) depends on the number m of insertion positions that are comprised in the preparing station. Now in several current solutions, this parameter m is in practice limited to six (m≤6).

3. SUMMARY

In one particular embodiment of the invention, a method is proposed for processing a list of customer orders in a customer-order preparing system, each customer order comprising one or more customer-order lines, each customer-order line comprising a customer-order identifier, a reference and a quantity of unit loads, said customer-order preparing system comprising a control system and at least one preparing station receiving:

source loads, each containing unit loads of one or more of the references, and shipping loads, each intended to contain the unit loads of one of the customer orders, said at least one preparing station comprising:

a picking position that is single and configured to enable a picking, from one of the source loads, of at least one unit load of one of the references in compliance with one of the customer-order lines;

an insertion position that is single and configured to enable an insertion, into one of the shipping loads, of said at least one picked unit load; and means of recirculation, configured to enable certain of the shipping loads to be placed several times in the insertion position.

The control system performs the following steps:

selecting a reference present in the greatest number of customer-order lines among all the customer-order lines of said list of customer orders;

determining a set E of all the $N_E$ customer orders each containing a customer-order line containing said selected reference;

creating a group G of N customer orders that are either the $N_E$ customer orders if $N_E \leq N_{max}$ with $N_{max}$ being a predetermined threshold, or the $N_{max}$ first customer orders resulting from a sorting of the $N_E$ customer orders according to a decreasing sequential order of the level of priority, if $N_E > N_{max}$;

building a list LC of the totality of the K customer-order lines contained in the N customer orders of the group G, in complying with the following rules:

if several of the K customer-order lines contain an identical reference, they succeed one another in the list LC in the form of a sub-list;

the N customer-order lines included in the sub-list corresponding to said selected reference contain N different customer-order identifiers in a given sequential order; and the customer-order lines not included in the sub-list corresponding to the selected reference contain customer-order identifiers, among the N customer-order identifiers, in a sequential order consistent with the given sequential order set in a loop; and controlling the customer-order preparing system to bring source loads to the picking position and shipping loads to the insertion position and to make the shipping loads recirculate up to the insertion position, according to the list LC.

Thus, the proposed solution proposes a wholly and inventive approach consisting in building a list LC comprising, in a particular order, the K customer-order lines of a group G of N customer orders and in controlling the customer-order preparing system as a function of this list LC. The list LC has the particular feature wherein it is built for a "one-to-one" type of preparing station (i.e. comprising a single picking position (n=1) and a single insertion position (m=1)) and comprising recirculation means. In other words, the principle of the proposed solution is characterized by a particular launching algorithm (launching of the K customer-order lines according to the list LC) associated with the capacity to make certain loads of the shipping loads recirculate locally (i.e. in the preparing station).

The proposed solution therefore makes it possible to benefit from the advantages of "one-to-one" type preparation station (especially the reduction, or even the elimination, of the customer-order preparing errors, as well as the reduction of mental stress for the operator present at the preparing station), while at the same time enabling the preparation of customer orders by splitting up (i.e. picking up, from a same source load, unit loads that are then deposited in different (N) shipping loads).

Another advantage of the proposed solution is that it reduces the number of exit or outgoing movements needed by the installation for the storage and removal of the source loads (internal supports). Indeed, with the proposed solution, the reduction of the number of exit movements needed by the installation for the storage and removal of the source loads (internal supports) depends on the number N (with $N \leq N_{max}$) which can be higher (it is for example equal to 10, 15 or more) than the parameter m of the current customer-order preparing stations which itself is in practice limited to 6).

According to one particular characteristic, the building of the list LC is done in complying also with the following rule: if at least two customer orders of the group G each comprise customer-order lines in at least two sub-lists, then the customer-order lines of said at least two customer orders follow a same sequential order of customer orders in said at least two sub-lists.

Thus, the local recirculation, i.e. the recirculation in the preparing station, is minimized and therefore the resources necessary for this local recirculation are reduced, and it is possible to increase the output rate of the customer-order preparing system.

According to one particular characteristic, the building of the list LC is done in complying also with the following rule: when there is no precedence constraint, for the sub-list corresponding to the selected reference, between the customer-order lines comprised in said sub-list and other customer-order lines not comprised in said sub-list, if the list LC comprises at least two sub-lists, said at least two sub-lists mutually comply with a decreasing sequential order of the number of customer-order lines of each sub-list.

Thus, in a context "without precedence constraint", it is possible to finalize certain customer orders of the group G more rapidly (and remove the corresponding shipping loads), and this then facilitates the local recirculation for the remaining shipping loads.

According to one particular characteristic, the building of the list LC is done in complying also with the following rule: for at least one sub-list, the last customer-order line of said sub-list, which relates to a given customer order, is followed by one or more customer-order lines that:

belong to no sub-list whatsoever, relate to said given customer order and enable said given customer order to be finalized.

In this way, it is also possible to finalize certain customer orders of the group G more rapidly (and remove the corresponding shipping loads), and this then facilitates the local recirculation for the remaining shipping loads.

According to one particular characteristic, the building of the list LC is done in complying also with the following rule: when there is no precedence constraint, for the sub-list corresponding to the selected reference, between the customer-order lines comprised in said sub-list and other customer-order lines not comprised in said sub-list, the sequential order of the customer-order lines of said sub-list is computed as follows:

for each customer-order line of said sub-list: determining the customer order containing said customer-order line, computing the number of sub-lists to which all the customer-order lines of the determined customer order belong, and associating the computed number with said customer-order line; and sorting the customer-order lines of said sub-list according to a decreasing sequential order of the number associated with each customer-order line of said sub-list.

Thus, in the context "without precedence constraint", it is possible to finalize certain customer orders of the group G, namely those for which the customer-order lines have the largest number of common references with the customer-order lines of the other customer orders (and therefore to remove the corresponding shipping loads), and this thereafter facilitates the local recirculation for the remaining shipping loads.

According to one particular characteristic, the building of the list LC is done in complying also with the following rule: when there is no precedence constraint, for the sub-list or for each sub-list, between the customer-order lines comprised in said sub-list and other customer-order lines not comprised in said sub-list, the list LC begins with the sub-list comprising the greatest number of customer-order lines.

Thus, in the context "without precedence constraint", it is possible also to finalize certain customer orders of the group G more rapidly (and remove the corresponding shipping loads), and this thereafter facilitates the local recirculation for the remaining shipping loads.

According to one particular characteristic, if after the creation of the group G there is at least one priority non-grouped customer order not included in the group G and having a level of priority higher than the highest level of priority of the customer orders of the group G, then the control system processes said at least one priority non-grouped customer order before the step of control of the system for preparing customer orders as a function of the list LC.

In this way, the customer orders that do not form part of a group as understood here above can be processed in complying with their priority level.

In another embodiment of the invention, a customer-order preparing system is proposed, configured to process a list of customer orders, each customer order comprising one or more customer-order lines, each customer-order line comprising a customer-order identifier, a reference and a quantity of unit loads, and a priority level. The customer-order preparing system comprises a control system configured to implement the method here above (in any one of its embodiments) and at least one preparing station receiving source loads (each containing unit loads of one or more references) and shipping loads (each intended to contain the unit loads of one of the customer orders). Said preparing station comprises:

a picking position that is single and configured to enable an operation of picking, from one of the source loads, of at least one unit load of one of the references in compliance with one of the customer-order lines;

an insertion position that is single and configured to enable an insertion in one of the shipping loads; of said at least one picked unit load; and means of recirculation configured to enable certain of the shipping loads to be placed several times in the insertion position.

The customer-order preparing system of the present solution is therefore configured to implement the method described further above: the preparing station is of the "one-to-one" type and comprises recirculation means.

According to one particular characteristic, the recirculation means comprise:

a shipping loads entry conveyor placed upstream to said insertion position;

a shipping loads exit conveyor placed downstream from said insertion position;

a blocking device configured to block the shipping loads upstream to a waiting point of the shipping loads entry conveyor; and a transfer device configured to transfer shipping loads one by one from a departure location situated on the shipping loads exit conveyor to an arrival location situated on the shipping loads entry conveyor immediately downstream from the waiting point.

Thus, the preparing station of the present solution requires adaptations that are simple to implement and cost little as compared with a classic "one-to-one" type of preparing station.

According to one particular characteristic, the recirculation means form a recirculation loop of $N_{max}+1$ or $N_{max}+2$ locations, comprising:

locations situated on the shipping loads entry conveyor, from and including the arrival location up to a location preceding the insertion position;

the insertion position; and locations situated on the shipping loads exit conveyor from a location following the insertion position up to and including the departure location.

In this way, the resources needed to make the recirculation loop are minimized.

According to one particular characteristic, the shipping loads entry conveyor and the shipping loads exit conveyor are rectilinear conveyors longitudinally contiguous to each other, the departure location situated on the shipping load exit conveyor being adjacent to the arrival location.

Thus, the transfer device is simple to make (whether it is a transfer table or any other equivalent system).

4. LIST OF FIGURES

Other features and characteristics of the invention shall appear from the following description, given by way of a non-restrictive indication and from the appended drawings, of which:

FIG. 1 presents a partial view of an example of a customer-order preparing system according to one particular embodiment of the invention.

FIG. 2 presents a flowchart of a method for processing a list of customer orders according to one particular embodiment of the invention.

Figure 1:
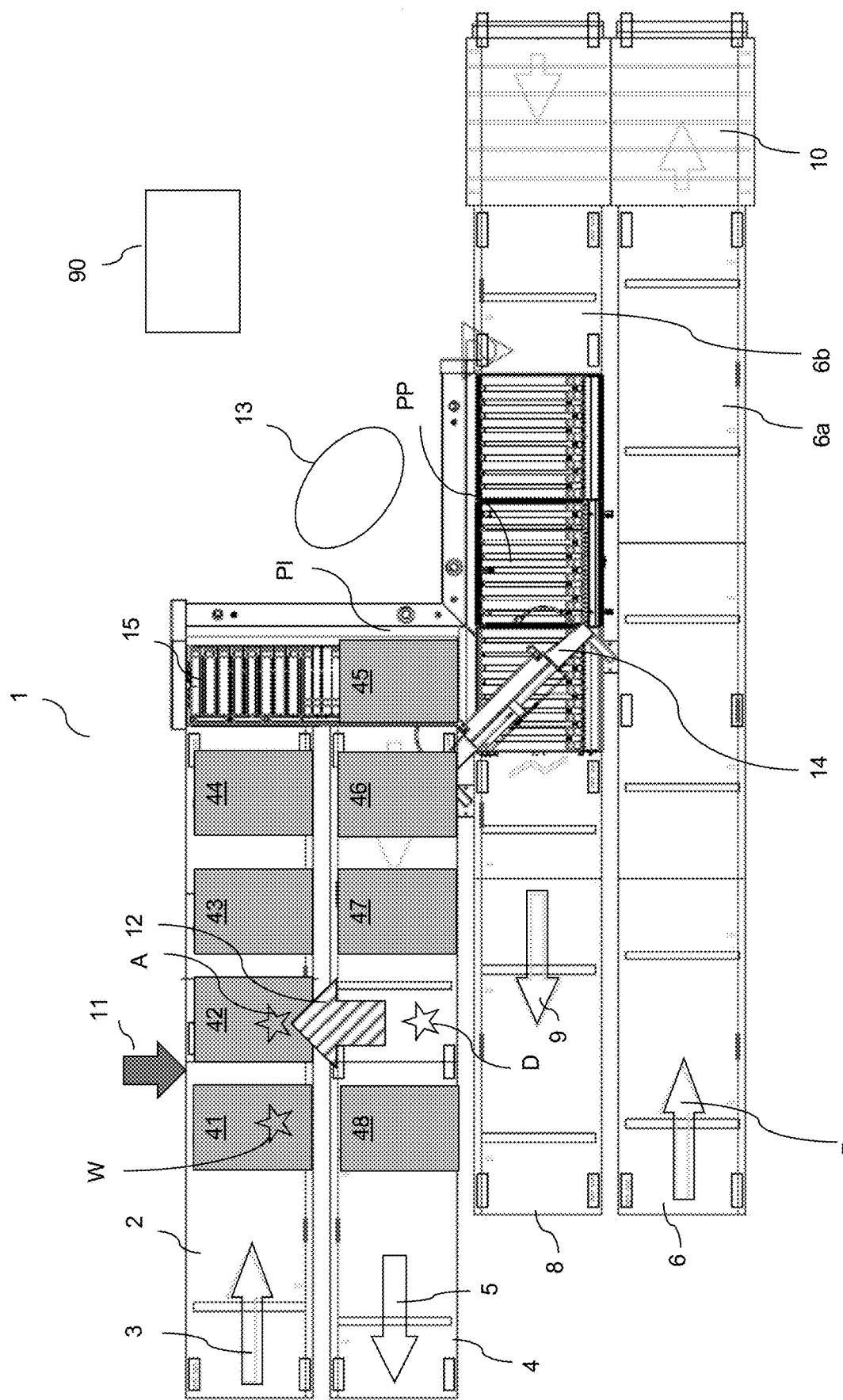
Figure 4:
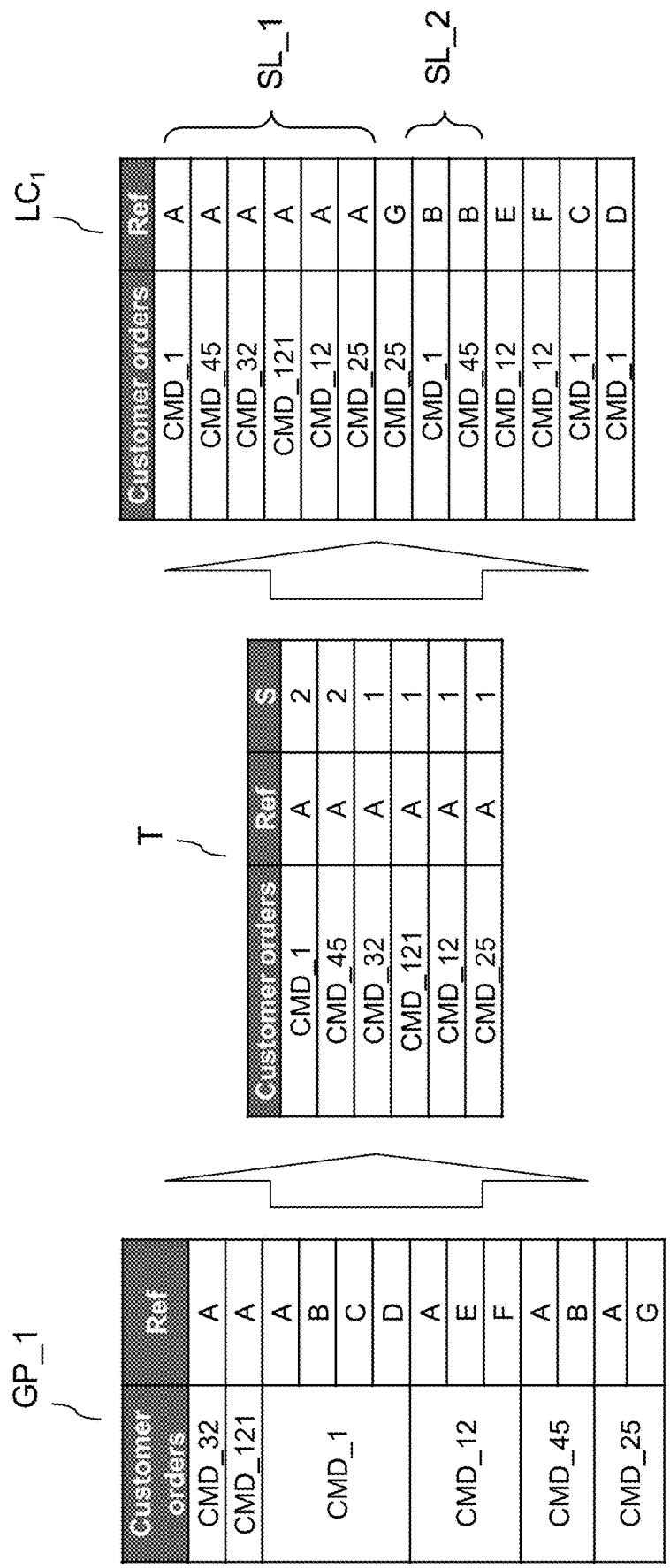
FIG. 4 illustrates a first example of application of the step 24 of FIG. 2, with the building of a list $LC_1$ with the K customer-order lines of the group GP_1 of FIG. 3.

FIGS. 6A to 6M present the successive steps of control of the customer-order preparing system of FIG. 1 as a function of the list $LC_1$ of FIG. 4.

FIG. 7 presents the structure of a control system according to one particular embodiment of the invention.

5. DETAILED DESCRIPTION

In all the figures of the present document, the elements and identical steps are designated by a same numerical reference.

FIG. 1 presents a partial view of an example of a customer-order preparing system according to one particular embodiment of the invention.

The customer-order preparing system comprises especially a control system 90 (see below the description of FIG. 7) and at least one preparing station 1 receiving source loads and shipping loads.

The preparing station 1 comprises:
- a picking position PP that is single and configured to enable picking by an operator (or a robot) 13, in one of the source loads, of at least one unit load of one of the products in compliance with the product reference on one of the customer-order lines;
- an insertion position PI that is single and configured to enable an insertion by the operator (or the robot) 13 into one of the shipping loads, of the picked unit load or loads;
- a display device 14 providing the operator with various pieces of information (especially for each customer-order line, the reference and the quantity of the unit loads to be picked);
- a shipping loads entry conveyor 2 placed upstream to the insertion position PI and for which the direction of progress of the loads that it carries (for example those referenced 41 to 44) is symbolized by the arrow referenced 3;
- a shipping loads exit conveyor 4, placed downstream from the insertion position PI, and for which the direction of progress of loads that it carries (for example those referenced 45 to 48) is symbolized by the arrow referenced 5;
- a source loads entry conveyor 6, placed upstream to the picking position PP and for which the direction of progress of the loads that it carries is symbolized by the arrow referenced 7;
- a source loads exit conveyor 8 placed downstream from the picking position PP and for which the direction of progress of the loads that it carries is symbolized by the arrow referenced 9;
- recirculation means configured to enable certain of the shipping loads to be placed several times in the insertion position.

The recirculation means comprise, in addition to the shipping loads entry conveyor 2 and the shipping loads exit conveyor 4:
- a blocking device (symbolized by the arrow referenced 11) configured to block the shipping loads upstream to a waiting point (symbolized by the star referenced W) of the shipping loads entry conveyor 2; and
- a transfer device (symbolized by the arrow referenced 12), configured to transfer, one by one, shipping loads from a departure location (symbolized by the star referenced D) situated on the shipping loads exit conveyor 4 towards an arrival location (symbolized by the star referenced A) situated on the shipping loads entry conveyor 2, immediately downstream from the waiting point W. This is for example a transfer table or any other equivalent device.

The recirculation means form a recirculation loop with $N_{max}+1$ or $N_{max}+2$ locations (the parameter $N_{max}$ is described in detail here below) comprising:
- locations situated on the shipping loads entry conveyor 2, from and including the arrival location A up to a location preceding the insertion position PI;
- the insertion position PI; and
- locations situated on the shipping load exit conveyor 4, from a location following the insertion position PI up to and including the departure location D In the example of FIG. 1, the recirculation loop comprises seven locations (this corresponds to the case $N_{max}=6$): three upstream to the insertion position PI (locations occupied by the loads referenced 42, 43 and 44), one corresponding to the insertion position PI (location occupied by the load referenced 45) and three downstream from the insertion position PI (two locations occupied by the loads referenced 46 and 47 and one unoccupied location that corresponds to the departure location D).

In the particular embodiment of FIG. 1, the shipping loads entry conveyor 2 and the shipping loads exit conveyor 4 are rectilinear conveyors longitudinally contiguous to each other (in other words, they are parallel to each other and adjacent on one of their longitudinal sides). Transfer means 15 (transfer table or any other equivalent device) are configured to shift the source loads from one rectilinear conveyor to the other. The insertion position PI corresponds to the position occupied by a shipping load on the transfer means 15 before passing to the shipping loads exit conveyor 4. The departure location D is adjacent to the arrival location A.

In the particular embodiment of FIG. 1, the source loads entry conveyor 6 comprises two rectilinear portions (conveyor portions) 6a and 6b, longitudinally contiguous with each other. In other words, the two portions 6a and 6b are parallel to each other and adjacent on one of their longitudinal sides. Transfer means 10 (transfer table or any other equivalent device) are configured to shift the source loads from one strand to the other. The source loads exit conveyor 8 is a rectilinear conveyor aligned (i.e. placed end to end) with the second portion 6b of the source loads entry conveyor 6 and is longitudinally contiguous with the first portion 6a of the source loads entry conveyor 6. In other words, the source loads exit conveyor 8 and the first portion 6a of the source loads entry conveyor 6 are parallel to each other and adjacent on one of their longitudinal sides. In short, the assembly formed by the end-to-end positioning of the sources loads exit conveyor 8 and the second portion 6b is longitudinally contiguous with the first portion 6a.

Figure 2:
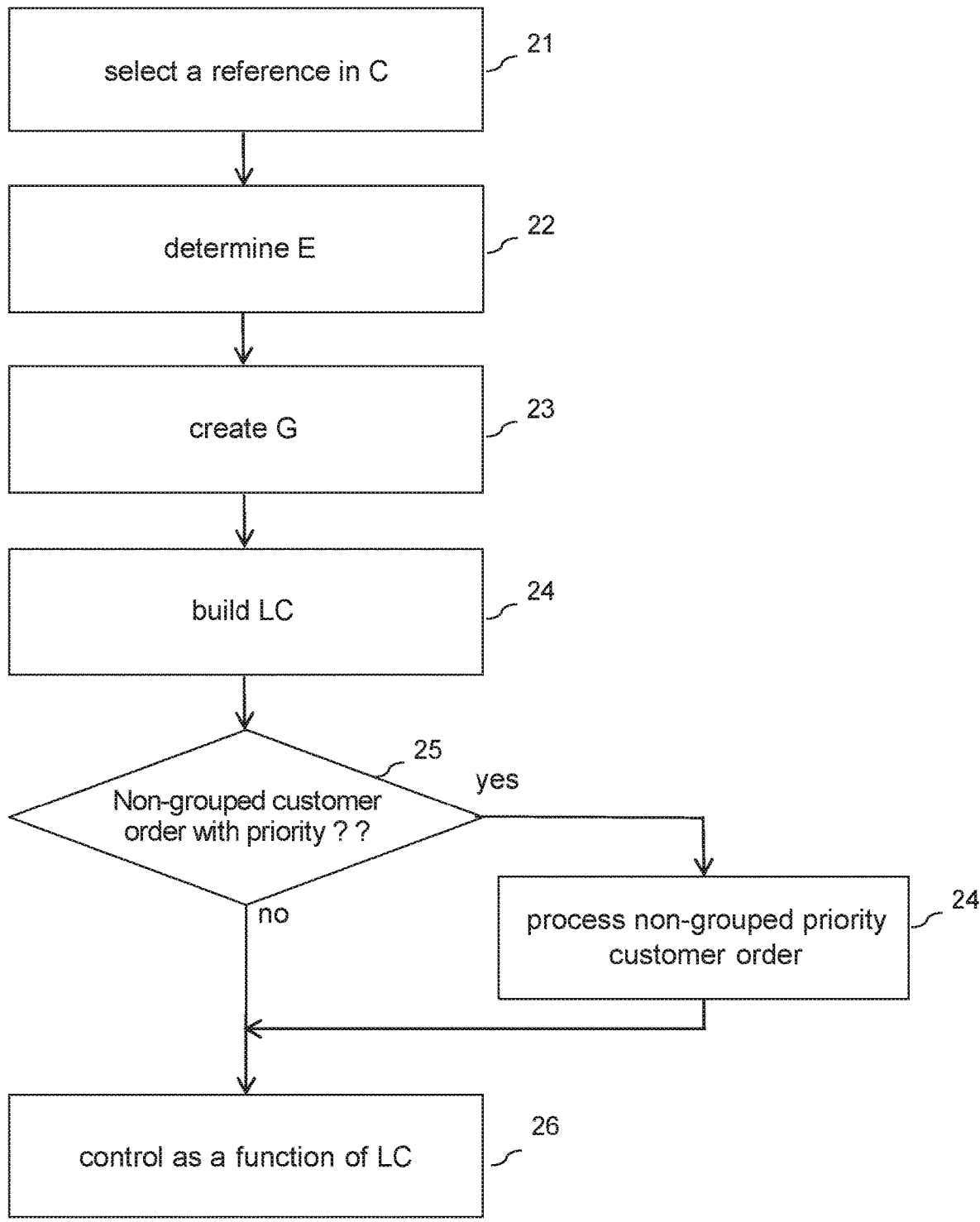

Referring now to FIG. 2, we present a method for processing a list of customer orders C according to one particular embodiment of the invention. It is implemented by the control system 90.

As already mentioned here above, it is assumed that each customer-order comprises one or more customer-order lines and each customer-order line comprises a customer-order identifier, a unit load reference, or product reference, a quantity of unit loads of said product reference and a level of priority.

In a step 21, the control system 90 selects a product reference present in the greatest number of customer-order lines among all the customer-order lines of the list of customer orders C.

In a step 22, the control system 90 determines a set E of all the customer orders $N_E$ each containing a customer-order line containing the selected product reference.

In a step 23, the control system 90 creates a group G of N customer orders that are either the $N_E$ customer orders, if $N_E \leq N_{max}$ with $N_{max}$ being a predetermined threshold, or the $N_{max}$ first customer orders resulting from a sorting of the $N_E$ customer orders according to a decreasing order of level of priority if $N_E > N_{max}$.

In a step 24, the control system 90 builds a list LC of the totality of the K customer-order lines contained in the N customer orders of the group G, in complying with a set of rules comprising the following rules:

Rule No. 1: if several of the K control lines contain an identical product reference, they succeed one another in the list LC in the form of a sub-list;

Rule No. 2: the N customer-order lines included in the sub-list corresponding to the selected product reference contain N different customer-order identifiers in a given sequential order; and Rule No. 3: the customer-order lines not included in the sub-list corresponding to the selected product reference contain customer-order identifiers among the N customer-order identifiers in a sequential order consistent with the given sequential order set in a loop.

In one particular implementation, the set of rules furthermore comprises one or more or the totality of the rules that follow.

Rule No. 4: if at least two customer orders of the group G each comprise customer-order lines in at least two sub-lists, the customer-order lines of these at least two customer orders follow a same sequential order of customer orders in the at least two sub-lists.

Rule No. 5: if the list LC comprises at least two sub-lists, then these sub-lists mutually comply with a decreasing sequential order of the number of customer-order lines in each sub-list.

Rule No. 6: for at least one sub-list, the last customer-order line of this sub-list, which relates to a given customer order, is followed by one or more customer-order lines that:
  belong to no sub-list,
  relate to the given customer order and
  enable the given customer order to be finalized.

Rule No. 7: when there is no precedence constraint, for the sub-list corresponding to the selected product reference, between the customer-order lines comprised in the sub-list and other customer-order lines not comprised in the sub-list, the order of the customer-order lines of the sub-list is computed as follows:
  for each customer-order line of the sub-list: determining the customer order containing the customer-order line, computing the number of sub-lists to which all the customer-order lines of the determined customer order belong and associating the computed number with the customer-order line; and
  sorting the customer-order lines of the sub-list according to a decreasing sequential order of the number associated with each customer-order line of the sub-list.

Rule No. 8: when there is no precedence constraint, for each of the sub-lists, between the customer-order lines comprised in the sub-list and other customer-order lines not comprised in the sub-list, the list LC begins with the sub-list comprising the greatest number of customer-order lines.

In a test step 25, the control system 90 determines if there is at least one non-grouped customer order having priority, i.e. a customer order not comprised in the group G and having a priority level higher than the highest priority level of the customer orders of the group G.

In the event of a negative response at the step 25, the control system 90 passes to a step 26, in which it controls the customer-order preparing system to make it convey source loads to the picking position PP and shipping loads to the insertion position PI, and makes the shipping loads recirculate locally (i.e. in the picking station) up to the insertion position PI, as a function of the list LC.

In the event of a positive response at the test step 25, the control system 90 passes to a step 24 in which it processes the non-grouped priority customer order or orders and then it passes to the above-mentioned step 26.

Figure 3:
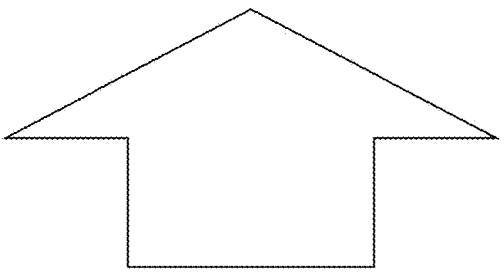
FIG. 3 illustrates an example of the creation of a group GP_1 of N customer orders comprising K customer-order lines by application of steps 21 to 23 of FIG. 2.

FIG. 3 illustrates an example of a creation of a group G (denoted as GP_1) of N customer orders comprising K customer-order lines by application of the steps 21 to 23 of FIG. 2.

The left-hand part of FIG. 3 represents, in the form of a first table, an example of a list of customer orders C. The first table comprises three columns:
  the first column contains, for each customer order, a customer-order identifier;
  the second column contains, for each customer-order line of a given customer order, a unit load reference; and
  the third column contains, for each customer-order line of a given customer order, a priority level. In this example, the priority level is the time of departure of the shipping truck that should transport the shipping load containing the unit loads required by the customer order, (i.e. the shipping load in which are placed the unit loads indicated in the lines of the customer order in terms of product reference and quantity).

For the sake of simplification alone, FIG. 3 does not show another column containing, for each customer-order line of a given customer order, a quantity of unit loads.

The customer-order list C comprises 11 customer orders themselves comprising (in a cumulative total) 20 customer-order lines. For example, the customer order CMD_1 comprises four customer-order lines corresponding to the unit load references A, B, C and D respectively, and it possesses the priority level "18h" (like each of the customer-order lines that form it). The customer order CMD_32 comprises a single customer-order line corresponding to the unit load reference A, and it possesses the priority level "14h". The customer order CMD_32 therefore has a higher priority level than the customer order CMD_1.

The right-hand part of FIG. 3 represents, in the form of a second table 31, an example of a group GP_1 of N customer orders obtained by application of the steps 21 to 23 of FIG. 2. It is assumed that $N_{max}=6$. The second table comprises four columns:
  the first contains an identifier of the created group ("GP_1"), or else a "not selected" indication for each customer order not included in the created group;
  the second contains, for each customer order of the group GP_1 or each "not selected" customer order, a customer-order identifier;
  the third contains, for each customer-order line of a given customer order, a unit load reference; and
  the fourth contains, for each customer-order line of a given customer order, a level of priority.

The group GP_1 comprises six customer orders (CMD_32, CMD_121, CMD_1, CMD_12, CMD_45, CMD_25) themselves comprising (in a cumulative total) 13 customer-order lines (K=13).

Summary of the application of the steps 21 to 23 of FIG. 2:

step 21: the control system 90 selects the product reference A because it is present in the eight customer-order lines among the K customer-order lines of the list of customer orders C;

step 22: E={CMD_1, CMD_12, CMD_25, CMD_32, CMD_45, CMD_110, CMD_45, CMD_110}, NE=8;

step 23: $N_E > N_{max}$, therefore the group GP_1 comprises six first customer orders (CMD_32, CMD_121, CMD_1, CMD_12, CMD_45, CMD_25) resulting from a sorting of the NE=8 customer orders according to a decreasing sequential order of the level of priority.

FIG. 4 illustrates a first example of application of the step 24 of FIG. 2 with the building of a list $LC_1$ with the K customer-order lines of the group GP_1 of FIG. 3.

The left-hand part of FIG. 4 represents the group GP_1 (see FIG. 3) and the right-hand part of FIG. 4 represents the list $LC_1$.

Application of rule No. 1: the list $LC_1$ comprises four sub-lists SL_1 (customer-order lines containing the reference A) and SL_2 (customer-order lines containing the reference B).

Application of rule No. 2: the six customer-order lines included in the sub-list SL_1 (corresponding to the selected reference A) contain six different customer-order identifiers in a given sequential order: CMD_1, CMD_45, CMD_32, CMD_121, CMD_12, CMD_25 (see rule No. 7).

Application of rule No. 3: the customer-order lines not included in the sub-list SL_1 contain customer-order identifiers in the following sequential order: CMD_25, CMD_1, CMD_45, CMD_12, CMD_12, CMD_1, CMD_1), which is a sequential order consistent with the given sequential order (see application of the rule No. 2) set in a loop (i.e. after the last element CMD_25 of the given order, we return to the first element CMD_1 of the given sequential order).

Application of rule No. 4: The customer orders CMD_1 and CMD_45 each comprise customer-order lines in the sub-lists SL_1 and SL_2, hence the customer-order lines of these customer orders CMD_1 and CMD_45 follow a same sequential order of customer order in the two sub-lists SL_1 et SL_2.

Application of rule No. 5: it is assumed that there is no precedence constraint, for the sub-list SL_1 (corresponding to the selected product reference), between the customer-order lines comprised in the sub-list SL_1 and other customer-order lines not comprised in the sub-list SL_1. The list $LC_1$ comprises two sub-lists SL_1 and SL_2 which mutually comply with a decreasing sequential order of the number of customer-order lines in each sub-list (six in SL_1, two in SL_2).

Application of rule No. 6: for the sub-list SL_1, the last customer-order line of this sub-list, which is related to the customer order CMD_25, is followed by a customer-order line that belongs to no sub-list (concerns the reference G), is related to the customer order CMD_25 and enables the customer order CMD_25 to be finalized.

Application of rule No. 7: the above assumption of absence of a precedence constraint (see application of rule No. 5) is maintained. As illustrated by the table T of the central part of FIG. 4, the sequential order of the customer-order lines of the sub-list SL_1 (called a "given sequential order" in the application of the rule No. 2) is computed as follows:

for each customer-order line of the sub-list SL_1: determining the customer order containing the customer-order line, computing the number S of sub-lists to which all the customer-order lines of the determined customer order belong and associating the computed number with the customer-order lines; and sorting the customer-order lines of the sub-list SL_1 (cf. right-hand part of FIG. 4) in a decreasing sequential order of the number S associated with each customer-order line of the sub-list.

Application of rule No. 8: the above assumption of an absence of a precedence constraint (see application of the rule No. 5) being maintained, the list $LC_1$ begins with the sub-list SL_1.

Figure 5:
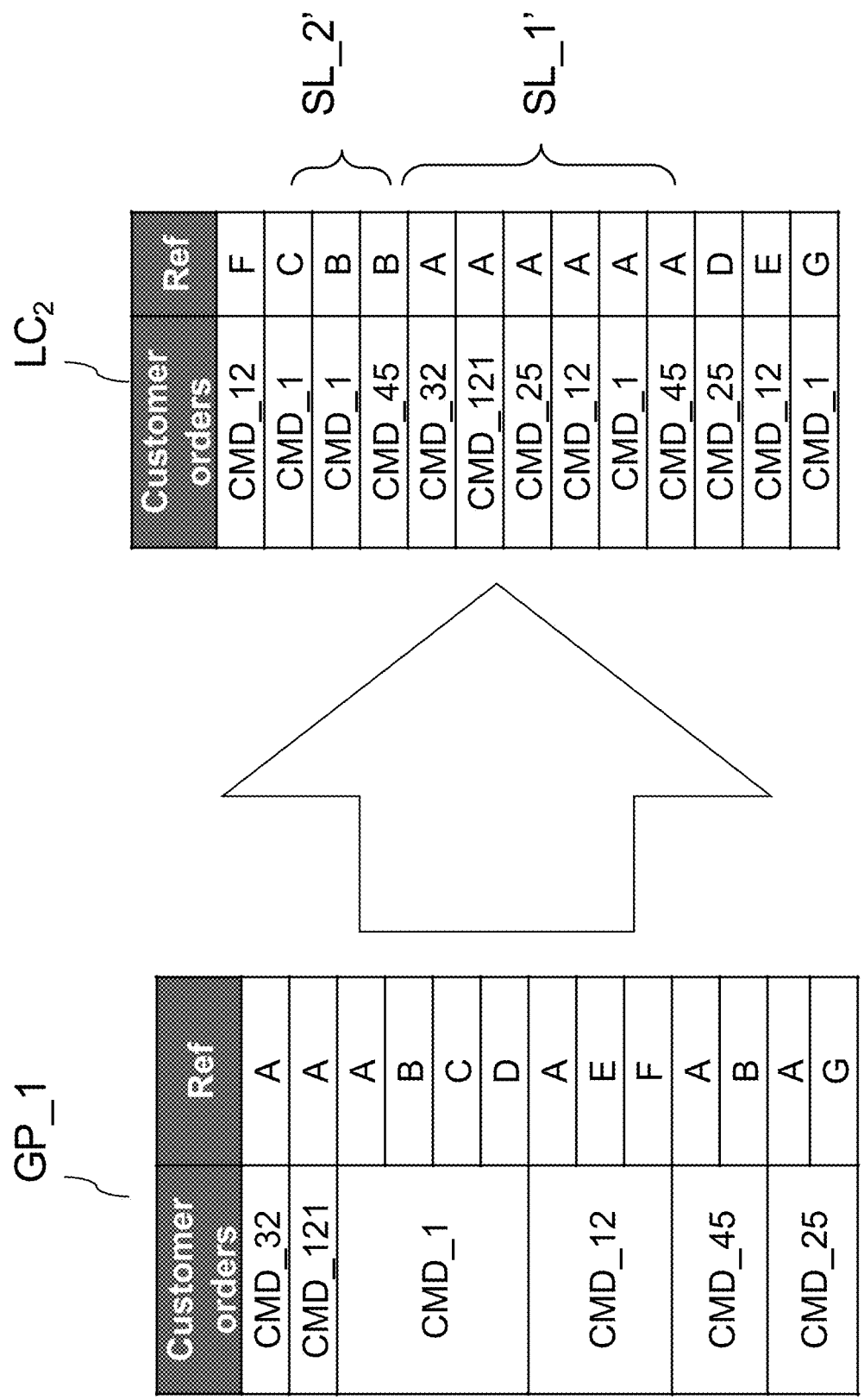
FIG. 5 illustrates a second example of application of the step 24 of FIG. 2, with the building of a list $LC_2$ with the K customer-order lines of the group GP_1 of FIG. 3.

FIG. 5 illustrates the second example of application of the step 24 of FIG. 2, with the building of a list $LC_2$ with the K customer-order lines of the group GP_1 of FIG. 3.

The left-hand part of FIG. 5 represents the group GP_1 (see FIG. 3) and the right-hand part of FIG. 3 represents the list $LC_2$.

It is assumed that there are constraints of precedence for the sub-list SL_1' (corresponding to the selected reference A) between certain customer-order lines of the sub-list SL_1' and other customer-order lines not comprised in the sub list SL_1':

in the customer order CMD_1, the customer-order lines bearing the references C and B must be processed before the customer-order line bearing the reference A; and in the customer order CMD_12, the customer-order line bearing the reference F must be processed before the customer-order line bearing the reference A.

As a consequence, unlike in the example of FIG. 4, the rules Nos. 5, 7 and 8 are not applicable.

Application of rule No. 1: the list $LC_1$ comprises two sub-lists SL_1' (customer-order lines containing the reference A) and SL_2' (customer-order lines containing the reference B).

Application of rule No. 2: the six customer-order lines included in the sub-list SL_1' (corresponding to the selected reference A) contains six different customer-order identifiers in a given sequential order (different from that of FIG. 4, because of the constraints to be met): CMD_32, CMD_121, CMD_25, CMD_12, CMD_1, CMD_45.

Application of rule No. 3: the customer-order lines not included in the sub-list SL_1' contain customer-order identifiers in the following sequential orders:

before the sub-list SL_1': CMD_12, CMD_1, CMD_1, CMD_45; and after the sub-list SL_1': CMD_25, CMD_12, CMD_1;

which are sequential orders consistent with the given sequential order (see application of rule No. 2) set in a loop (i.e. after the last element CMD_45 of the given sequential order, we return to the first element CMD_32 of the given sequential order).

Application of rule No. 4: the customer orders CMD_1 and CMD_45 each comprise customer-order lines in the sub-lists SL_1' and SL_2', therefore the customer-order lines of these customer orders CMD_1 and CMD_45 follow a same sequential order of customer order in both sub-lists SL_1' and SL_2'.

Application of rule No. 6: it does not have to be applied in this example.

FIGS. 6A to 6M present successive steps of control of the customer-order preparing system of FIG. 1 as a function of the list $LC_1$ of FIG. 4.

In each of the FIGS. 6A to 6M, the left-hand part represents, in a portion, the customer-order lines already processed since the beginning of the process, and the right-hand part represents the positions of the source loads and of the shipping loads within the customer-order preparing system of FIG. 1.

Purely for the sake of clarity, each source load is referenced by the product reference of the unit products or items that it contains. We therefore have source loads referenced A, B, C, D, E, F and G. It is clear however that the present invention is not limited to the case where each storage container is associated with a single product reference but can be applied also to cases where at least some of the storage containers are each associated with several product references.

In the same way, each shipping load is referenced by the identifier of the customer order, the unit products of which are intended to be contained in this shipping load. We then have shipping loads referenced CMD_1, CMD_45, CMD_32, CMD_121, CMD_12 and CMD_25.

Figure 6A:
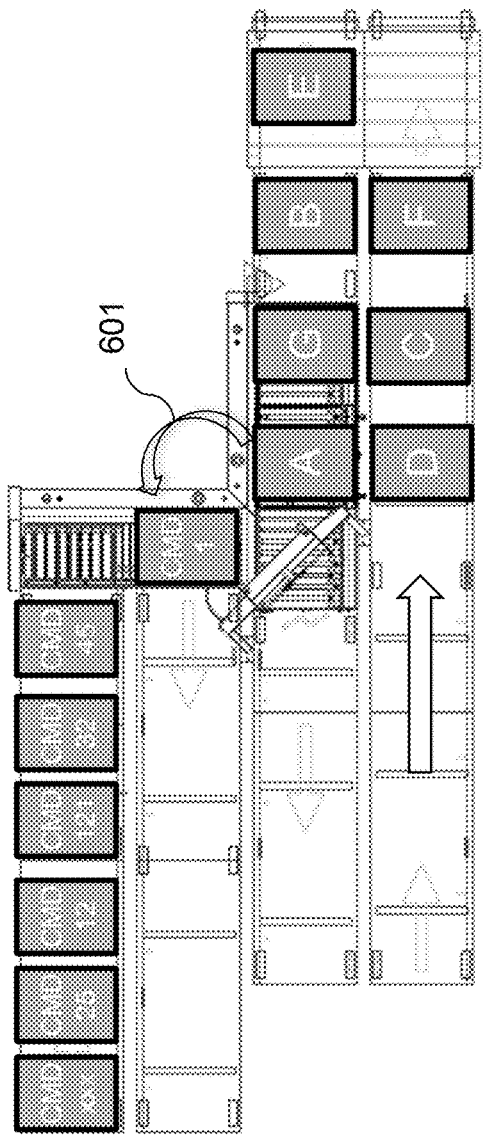

In FIG. 6A, the arrow referenced 601 symbolizes a picking of unit loads from the source load A (positioned at the picking position PP) and their insertion into the shipping load CMD_1 (positioned at the insertion position PT).

Figure 6B:
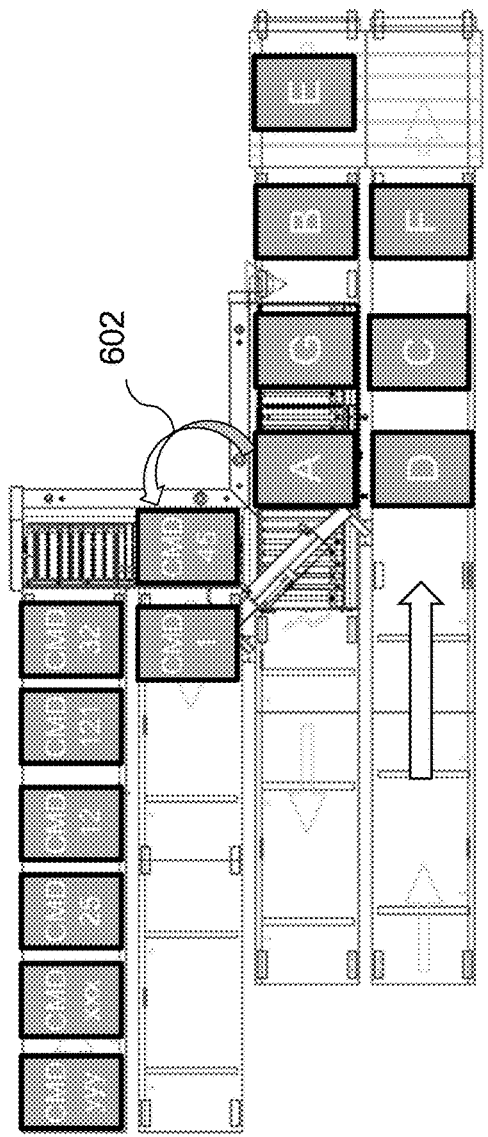

In FIG. 6B, it can be seen that all the shipping loads have moved forward by one position. The arrow referenced 602 symbolizes a picking of unit loads from the source load A (positioned at the picking position PP) and their insertion into the shipping load CMD_45 (positioned at the insertion position PI).

In FIG. 6C, it can be seen that all the shipping loads have moved forward by one location. The arrow referenced 603 symbolizes a picking of unit loads from the source load A (positioned at the picking position PP) and their insertion into the shipping load CMD_32 (positioned at the insertion position PI). The customer order CMD_32 is completed. The blocking device (symbolized by the arrow referenced 11) is actuated in order to block ("STOP") shipping loads (CMD_xxx, CMD-yyy, CMD_zzz) upstream to the waiting point A on the shipping loads entry conveyor 2.

In FIG. 6D, it can be seen that all the shipping loads have moved forward by one location. The arrow referenced 604 symbolizes a picking of unit loads from the source load A (positioned at the picking position PP) and their insertion into the shipping load CMD_121 (positioned at the insertion position PI). The customer order CMD_121 is completed. The shipping load CMD_1 is recirculated locally (i.e. in the preparing station), through the transfer device (symbolized by the arrow referenced 12) from the departure location D (situated on the shipping loads exit conveyor 4) to the arrival location A (situated on the shipping loads entry conveyor 2).

In FIG. 6E, it can be seen that all the shipping loads have moved forward by one location. The arrow referenced 605 symbolizes a picking of unit loads from the source load A (positioned at the picking position PP) and their insertion into the shipping load CMD_12 (positioned at the insertion position PI).

In FIG. 6F, it can be seen that all the shipping loads have moved forward by one location. The arrow referenced 606 symbolizes a picking of unit loads from the source load A (positioned at the picking position PP) and their insertion into the shipping load CMD_25 (positioned at the insertion position PT). The shipping loads CMD_32 and CMD-121 are removed (they do not need to be recirculated locally). The source load A is removed.

In FIG. 6G, it can be seen that all the source loads have moved forward by one location. The arrow referenced 607 symbolizes a picking of unit loads from the source load G (positioned at the picking position PP) and their insertion into the shipping load CMD_25 (positioned at the insertion position PI). The customer order CMD_25 is completed. The source load G is removed.

In FIG. 6H, it can be seen that all the shipping loads have moved forward by one location, along with all the source loads. The shipping load CMD_12 has been recirculated locally. The arrow referenced 608 symbolizes a picking of unit loads from the source load B (positioned at the picking position PP) and their insertion into the shipping load CMD_1 (positioned at the insertion position PI).

In FIG. 6I, it can be seen that all the shipping loads have moved forward by one location. The arrow referenced 609 symbolizes a picking of unit loads from the source load B (positioned at the picking position PP) and their insertion into the shipping load CMD_45 (positioned at the insertion position PI). The customer order CMD_45 is completed. The shipping load CMD_25 is removed (it does not need to be recirculated locally). The source load B is removed.

In FIG. 6J, it can be seen that all the shipping loads have moved forward by one location, along with all the source loads. The shipping load CMD_1 has been recirculated locally. The arrow referenced 610 symbolizes a picking of unit loads from the source load E (positioned at the picking position PP) and their insertion into the shipping load CMD_12 (positioned at the insertion position PI). The shipping load CMD_45 is removed (it does not need to be recirculated locally). The source load E is removed. The blocking device (symbolized by the arrow referenced 11) is deactivated in order to let through ("GO") the shipping loads CMD_xxx, CMD-yyy and CMD_zzz (preliminarily blocked upstream to the waiting point A on the shipping loads entry conveyor 2).

Figure 6K:
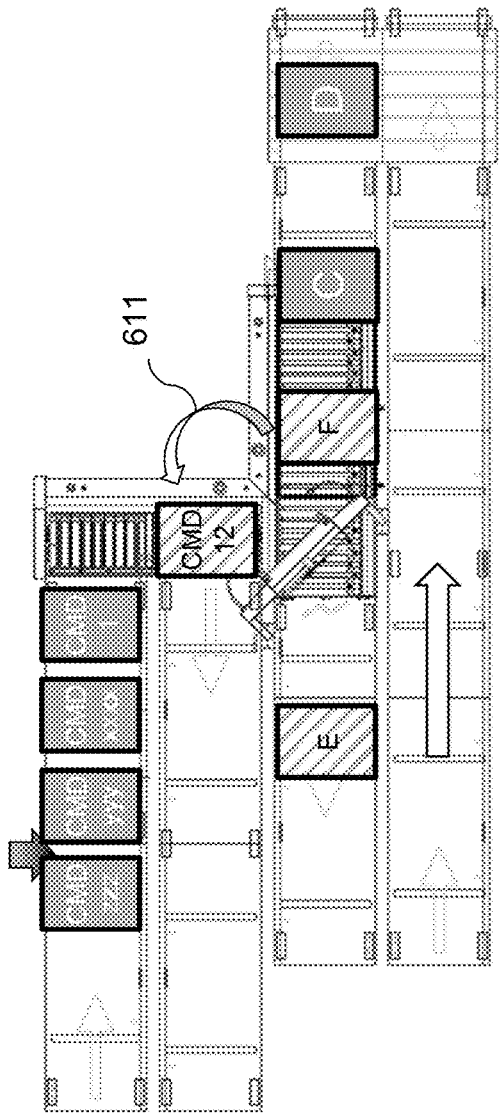

In FIG. 6K, it can be seen that all the source loads have moved forward by one location. The arrow referenced 611 symbolizes a picking of unit loads from the source load F (positioned at the picking position PP) and their insertion into the shipping load CMD_12 (positioned at the insertion position PI). The source load F is removed.

Figure 6L:
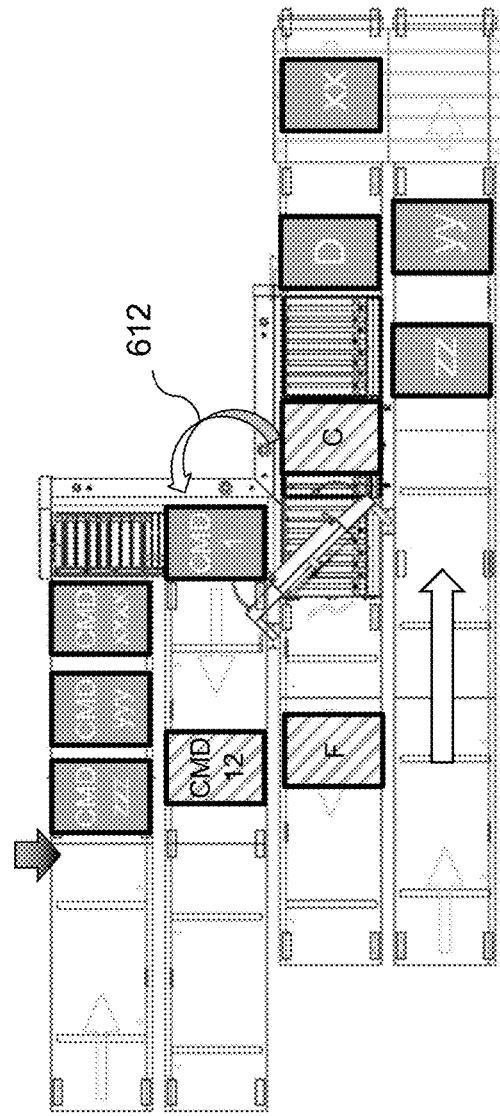

In FIG. 6L, it can be seen that all the shipping loads have moved forward by one location, along with all the source loads. The arrow referenced 612 symbolizes a picking of unit loads from the source load C (positioned at the picking position PP) and their insertion into the shipping load CMD_1 (positioned at the insertion position PI). The shipping load CMD_12 is removed (it does not need to be recirculated locally). The source load C is removed.

Figure 6M:
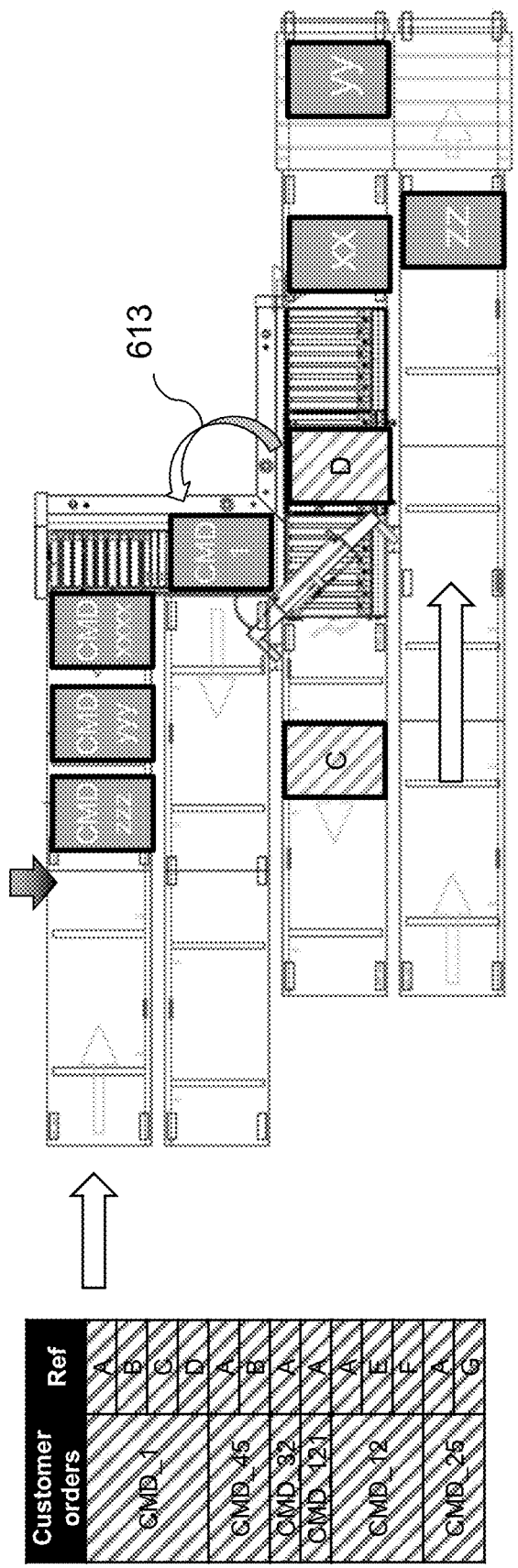

In FIG. 6M, it can be seen that all the source loads have moved forward by one location. The arrow referenced 613 symbolizes a removal of unit loads from the source load D (positioned at the picking position PP) and their insertion into the shipping load CMD_1 (positioned at the insertion position PI). The customer order CMD_1 is completed. The source load D is removed.

FIG. 7 presents the structure of the control system 90 according to one particular embodiment of the invention. This control system comprises a live memory 92 (for example a RAM), a processing unit 91, equipped for example with a processor and controlled by a computer program 930 stored in a read-only memory 93 (a ROM or a hard disk drive).

At initialization, the code instructions of the computer program are for example loaded into the live memory 92 and then executed by the processor of the processing unit 91, to implement the load-sequencing method of the invention (for example according to the embodiment of FIG. 3 in any one of its implementations). The processing unit 91 inputs the list of customer orders C. The processor of the processing unit 91 computes the list of customer-order lines LC (for example according to the algorithm of FIG. 2) and generates instructions 95 at output enabling the controlling (commanding) of different elements (2, 4, 6, 8, 10, 11, 12, 15) included in the customer-order preparing system (especially the different elements comprised in the preparing station 1, see FIG. 1).

This FIG. 7 illustrates only one particular manner among several possible ways of carrying out the technique of the invention in any one of its embodiments. Indeed, the control system can be carried out equally well on a reprogrammable computing machine (for example a PC computer, a DSP processor, a microcontroller etc.) executing a program comprising a sequence of instructions, or on a dedicated computation machine (for example a set of logic gates such as an FPGA or an ASIC or any other hardware module).

Should the control system be made with a reprogrammable computing machine, the corresponding program (i.e. the sequence of instructions) could be stored in a storage medium that is detachable (such as for example a floppy disk, a CD-ROM or a DVD-ROM) or non-detachable, this storage medium being partially or totally readable by a computer or a processor.

6. CONCLUSION

At least one exemplary embodiment overcomes the different drawbacks of the prior art.

At least one exemplary embodiment provides a solution for the processing of a list of customer orders in a customer-order preparing system, this solution enabling the reduction or even the elimination of errors in preparing customer orders (picking them out of the wrong source load and/or depositing them in the wrong shipping load).

At least one exemplary embodiment provides such a solution for reducing the mental stress on the operator present at the customer-order preparing station (so that this operator has to manage only the quantity of unit loads to be ensured in each picking operation).

At least one exemplary embodiment provides a solution such as this enabling the reduction of the number of exit movements needed by the installation for the storage and removal of the source loads (internal supports).

At least one exemplary embodiment provides such a solution that is simple to implement and costs little.

Although the present disclosure has been described with reference to one or more examples, workers skilled in the art will recognize that changes may be made in form and detail without departing from the scope of the disclosure and/or the appended claims.

The invention claimed is:

1. A method for processing a list of customer orders in a customer-order preparing system, each customer order comprising one or more customer-order lines, each customer-order line comprising a customer-order identifier, a product reference of a product and a quantity of unit loads of the product, and a level of priority, said customer-order preparing system comprising a control system and at least one preparing station receiving:
   source loads, each containing unit loads of one or more of the products referenced by the one or more product references, and
   shipping loads, each intended to contain the unit loads of one of the customer orders,
said at least one preparing station comprising:
   a picking position that is single and configured to enable a picking, from one of the source loads, of at least one unit load of one of the products in compliance with one of the customer-order lines;
   an insertion position that is single and configured to enable an insertion, into one of the shipping loads, of said at least one picked unit load; and
   a recirculation, configured to enable certain of the shipping loads to be placed several times in the insertion position;
wherein the method comprises the following steps performed by the control system:
   selecting a product reference present in the greatest number of customer-order lines among all the customer-order lines of said list of customer orders;
   determining a set E of all the $N_E$ customer orders each containing a customer-order line containing said selected product reference;
   creating a group G of N customer orders that are either the $N_E$ customer orders, if $N_E \leq N_{max}$ with $N_{max}$ being a predetermined threshold, or the $N_{max}$ first customer orders resulting from a sorting of the $N_E$ customer orders according to a decreasing sequential order of the level of priority, if $N_E > N_{max}$;
   building a list LC of the totality of the K customer-order lines contained in the N customer orders of the group G, in complying with the following rules:
      if several of the K customer-order lines contain an identical product reference, they succeed one another in the list LC in the form of a sub-list;
      the N customer-order lines included in the sub-list corresponding to said selected product reference contain N different customer-order identifiers in a given sequential order; and
      the customer-order lines not included in the sub-list corresponding to the selected product reference contain customer-order identifiers, among the N customer-order identifiers, in a sequential order consistent with the given sequential order set in a loop; and
   controlling the customer-order preparing system to bring source loads to the picking position and shipping loads to the insertion position and to make the shipping loads recirculate up to the insertion position, according to the list LC.

2. The method according to claim 1, wherein the building of the list LC complies with the following rule: if at least two customer orders of the group G each comprise customer-order lines in at least two sub-lists, then the customer-order lines of said at least two customer orders follow a same sequential order of customer orders in said at least two sub-lists.

3. The method according to claim 1, wherein the building of the list LC complies with the following rule: when, for the sub-list corresponding to the selected product reference, there is no precedence constraint between the customer-order lines comprised in said sub-list and other customer-order lines not comprised in said sub-list, when the list LC comprises at least two sub-lists, then said at least two sub-lists mutually comply with a decreasing sequential order of the number of customer-order lines of each sub-list.

4. The method according to claim 1, wherein the building of the list LC complies with the following rule: for at least one sub-list, the last customer-order line of said sub-list; which relates to a given customer order; is followed by one or more customer-order lines that:
   belong to no sub-list,
   relate to said given customer order, and
   enable said given customer order to be finalized.

5. The method according to claim 1, wherein the building of the list LC complies with the following rule: when there is no precedence constraint, for the sub-list corresponding to the selected reference, between the customer-order lines comprised in said sub-list and other customer-order lines not comprised in said sub-list, the sequential order of the customer-order lines of said sub-list is computed as follows:

for each customer-order line of said sub-list: determining the customer order containing said customer-order line, computing the number of sub-lists to which all the customer-order lines of the determined customer order belong, and associating the computed number with said customer-order line; and sorting the customer-order lines of said sub-list according to a decreasing sequential order of the number associated with each customer-order line of said sub-list.

6. The method according to claim 1, wherein the building of the list LC complies with the following rule: when, for the sub-list or for each sub-list, there is no precedence constraint between the customer-order lines comprised in said sub-list and other customer-order lines not comprised in said sub-list, then the list LC begins with the sub-list comprising the greatest number of customer-order lines.

7. The method according to claim 1, wherein if, after the creation of the group G there is at least one priority non-grouped customer order not comprised in the group G and having a level of priority higher than the highest level of priority of the customer orders of the group G, then the control system processes said at least one priority non-grouped customer order before the step of controlling the customer-order preparing system as a function of the list LC.

8. A customer-order preparing system configured to process a list of customer orders, each customer order comprising one or more customer-order lines, each customer-order line comprising a customer-order identifier, a product reference of a product and a quantity of unit loads of the product, and a priority level, wherein said customer-order preparing system comprises:

a control system, and at least one preparing station configured to receive:
source loads, each containing unit loads of one or more of the products referenced by the one or more product references, and
shipping loads each intended to contain the unit loads of one of the customer orders, wherein said at least one preparing station comprises:
a picking position that is single and configured to enable an operation of picking, from one of the source loads, of at least one unit load of one of the products in compliance with one of the customer-order lines;
an insertion position that is single and configured to enable an insertion, into one of the shipping loads, of said at least one picked unit load; and
a recirculation device configured to enable certain of the shipping loads to be placed several times in the insertion position; and wherein the control system is configured to:
select a product reference present in the greatest number of customer-order lines among all the customer-order lines of said list of customer orders;

determine a set E of all the $N_E$ customer orders each containing a customer-order line containing said selected product reference;

create a group G of N customer orders that are either the $N_E$ customer orders, if $N_E \leq N_{max}$ with $N_{max}$ being a predetermined threshold, or the $N_{max}$ first customer orders resulting from a sorting of the $N_E$ customer orders according to a decreasing sequential order of the level of priority, if $N_E > N_{max}$;

build a list LC of the totality of the K customer-order lines contained in the N customer orders of the group G, in complying with the following rules:
if several of the K customer-order lines contain an identical product reference, they succeed one another in the list LC in the form of a sub-list;
the N customer-order lines included in the sub-list corresponding to said selected product reference contain N different customer-order identifiers in a given sequential order; and
the customer-order lines not included in the sub-list corresponding to the selected product reference contain customer-order identifiers, among the N customer-order identifiers, in a sequential order consistent with the given sequential order set in a loop; and control the customer-order preparing system to bring source loads to the picking position and shipping loads to the insertion position and to make the shipping loads recirculate up to the insertion position, according to the list LC.

9. The customer-order preparing system according to claim 8, wherein the recirculation device comprises:

a shipping loads entry conveyor, placed upstream to said insertion position;

a shipping loads exit conveyor, placed downstream from said insertion position;

a blocking device configured to block the shipping loads upstream to a waiting point of the shipping loads entry conveyor; and a transfer device configured to transfer shipping loads one by one from a departure location situated on the shipping loads exit conveyor to an arrival location situated on the shipping loads entry conveyor immediately downstream from the waiting point.

10. The customer-order preparing system according to claim 9, wherein the recirculation device forms a recirculation loop of $N_{max}+1$ or $N_{max}+2$ locations, the recirculation loop comprising:

locations situated on the shipping loads entry conveyor, from and including the arrival location up to a location preceding the insertion position;

the insertion position; and locations situated on the shipping loads exit conveyor from a location following the insertion position up to and including the departure location.

11. The customer-order preparing system according to claim 10, wherein the shipping loads entry conveyor and the shipping loads exit conveyor are rectilinear conveyors longitudinally contiguous with each other, the departure location situated on the shipping load exit conveyor being adjacent to the arrival location.

* * * * *